United States Patent [19]

Dangschat

[11] Patent Number: 4,660,288

[45] Date of Patent: Apr. 28, 1987

[54] COUPLING DEVICE

[75] Inventor: Holmer Dangschat, Traunreut, Fed. Rep. of Germany

[73] Assignee: Dr. Johannes Heidenhain GmbH, Traunreut, Fed. Rep. of Germany

[21] Appl. No.: 888,816

[22] Filed: Jul. 22, 1986

[30] Foreign Application Priority Data

Aug. 1, 1985 [DE] Fed. Rep. of Germany ....... 3527546

[51] Int. Cl.$^4$ ............................................. G01B 11/00
[52] U.S. Cl. .................................... 33/1 L; 33/1 PT; 33/125 C; 33/1 N
[58] Field of Search .......... 33/1 L, 1 N, 1 PT, 1 MP, 33/125 C, 125 A, 164 R, 166

[56] References Cited

U.S. PATENT DOCUMENTS 4,495,700 1/1985 Ernst .................................. 33/1 PT
4,530,155 7/1985 Burkhardt et al. ................ 33/1 PT

FOREIGN PATENT DOCUMENTS 2952106 11/1982 Fed. Rep. of Germany .
3311203 10/1984 Fed. Rep. of Germany .
3340866 5/1985 Fed. Rep. of Germany .
2022267 12/1979 United Kingdom ............... 33/1 PT Primary Examiner—Willis Little
Attorney, Agent, or Firm—Willian Brinks Olds Hofer Gilson & Lione Ltd.

[57] ABSTRACT

A coupling device for connecting a standard incremental angular motion transducer with two objects to be measured wherein the transducer is of the type comprising a measuring scale with at least one reference mark and a scanning unit operative to scan the measuring scale. The coupling device enables the transducer to be calibrated while the two objects are stationary. The calibration process is performed using a motor which engages and rotates a gear wheel connected to the measuring scale. The rotation of the measuring scale is conducted against the force of a spiral spring until the reference mark is scanned by the scanning unit and a reference pulse generated. The measuring scale is then returned to its momentary position under the influence of the spiral spring and the motor disengaged.

8 Claims, 4 Drawing Figures

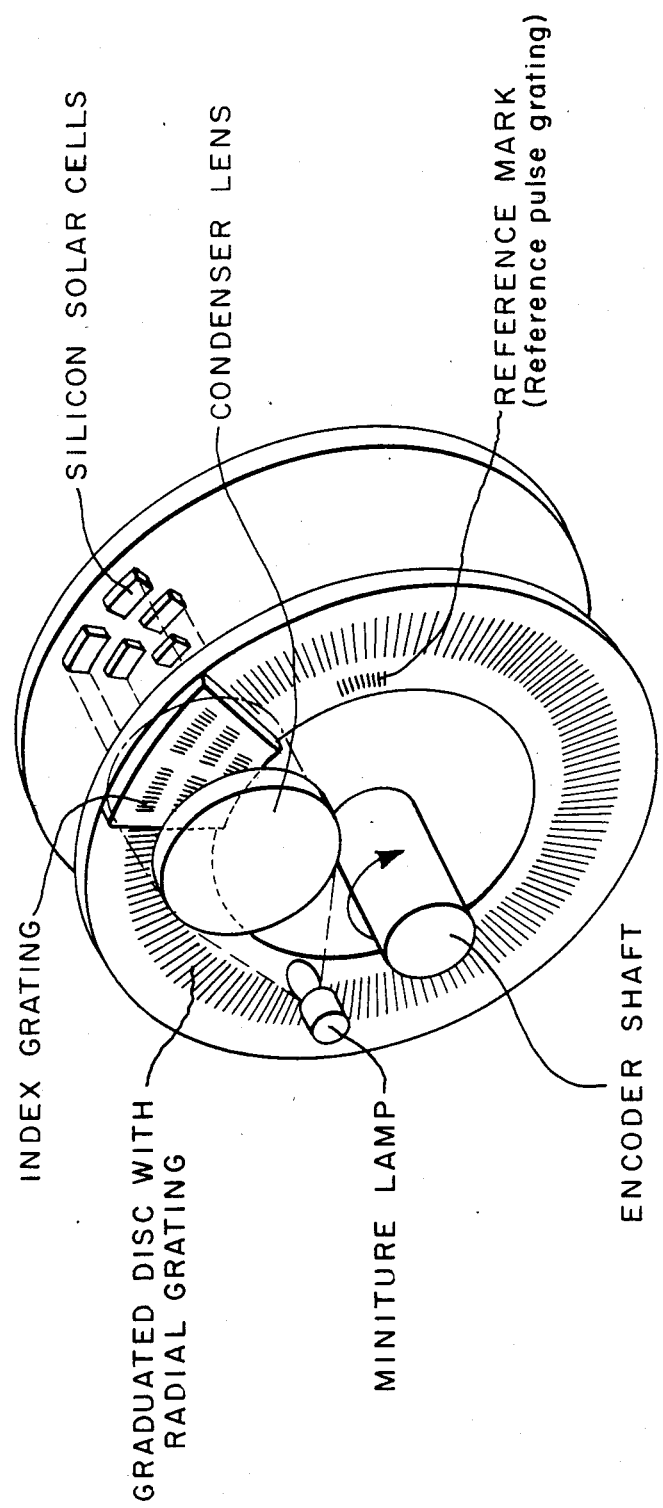

COUPLING DEVICE

BACKGROUND OF THE INVENTION

The present invention relates to a device for coupling a position measuring instrument with two objects movable relatively to one another such that the measuring instrument may be calibrated while the objects to be measured are maintained stationary.

The use of position measuring instruments to measure the relative position of two objects which are movable with respect to one another, such as a bed and slide piece of a machine tool, is well known in the art. In the case of automatic handling units, such as industrial robots, the movements are frequently measured with an angular motion transducer. Generally, the relative movement of two objects is measured by fastening a measuring scale to one of the objects and a scanning device to the other of the objects. The scanning device scans the measuring scale during relative movement to determine the relative position which may then be displayed. To protect the various components of the instrument from harmful environmental influences, the measuring instrument is provided with a casing which may be fastened to one of the objects to be measured.

For position measuring instruments that operate incrementally, the instrument must be calibrated with the aid of reference points before a measuring operation is begun or after an interruption. Such calibration processes are described in a number of patent applications, including German unexamined patent specification DE-OS 33 11 203. A special form of calibration is described in German unexamined specification De-OS 33 40 866. In this reference, an instrument for measuring the relative position of two objects is disclosed. The measuring instrument includes a graduation disk which comprises an incremental graduation and at least one reference mark. The graduation disk is borne on a shaft and housed within a casing. The graduation disk is connected with one of the objects by means of a carrier coupling and an additional shaft, also borne in the casing. The carrier coupling is such that it acts only in one rotational direction of the object. A slip coupling is used to connect the graduation disk with the object for rotation in the opposite direction. The slip coupling connects the shaft, which bears the graduation disk, with a motor which is operative to turn in the opposite direction. A scanning unit fastened to the casing scans the graduation disk. If the measurement operation is interrupted, the reference position may be reproduced by rotating the graduation disk with the pole-reversed motor. The additional shaft may be maintained in a stationary position throughout the rotation of the graduation disk. The rotation is continued until the reference mark is scanned by the scanning unit, at which point the graduation disk has been returned to the position it occupied with respect to the additional shaft at the time of the interruption. The angle of rotation, defined by the scanned reference mark and the pre-disturbance position, may then be used to recover the measurement value.

The above-described position measuring instrument, and others which are also suitable for calibrating the measuring instrument while the objects are maintained stationary, are well known in the art. However, these types of calibration instruments require increased construction and manufacturing costs over that of conventional simple position measuring instruments.

A disadvantage arises in that a vendor of position measuring instruments must be able to offer the expensive position measuring system, calibratable as described above, in addition to the standard instruments such as standard incremental angular motion transducers. The increased multiplicity of types of instruments which must be offered for sale results in an inefficient manner of operation for the vendor.

It is an object of the present invention to provide a device which may be used to connect a standard position measuring instrument with the objects to be measured such that the above-described calibration process may be performed with the objects at a standstill.

SUMMARY OF THE INVENTION

The present invention is directed to a device for coupling a measuring instrument to two objects movable with respect to one another wherein the measuring instrument comprises a measuring scale and a scanning unit and wherein the coupling device enables the measuring scale to be moved with respect to the scanning unit for calibration while the objects to be measured are maintained stationary.

According to the present invention, the coupling device connects a position measuring instrument with two objects which are movable with respect to one another. The measuring instrument is of the type which comprises a measuring scale and a scanning unit. The measuring scale comprises at least one reference mark and the scanning unit is operative to scan the measuring scale. The coupling device is operative such that the measuring scale is rotated in one direction in response to direct mechanical force supplied by one of the objects and is rotated in the opposite direction in response to force generated by a biasing means. A drive means is provided to rotate the measuring scale against the biasing force such that the reference mark may be scanned by the scanning unit. Once the reference mark has been scanned, the drive means allows the measuring scale to return to the position it occupied before the drive means was activated.

One advantage of the present invention is that it may be used with a standard angular motion transducer comprising a reference mark. The present invention enables the standard transducer to be calibrated in the above-described manner even in the case wherein the machine components to be measured momentarily cannot be moved with respect to one another. A further advantage is that the drive motor does not have to be continuously powered. Rather, the motor of a preferred embodiment is engaged only during the calibration process. During normal measuring operation, the motor is not engaged. This mode of operation increases the life of the motor which otherwise is substantially less than the life of the angular motion transducer. Additionally, with a preferred embodiment, an undesirable moment is not continuously transferred to the object to be measured as it is in the case of a position measuring instrument in which the drive motor and slip coupling are integral components of the system.

The invention itself, together with further objects and attendant advantages, will best be understood by reference to the following detailed description, taken in conjunction with the accompanying drawings.

BRIEF DESCRIPTION OF THE DRAWINGS

FIG. 4 is a perspective view of a device according to the present invention.

DETAILED DESCRIPTION OF THE PRESENTLY PREFERRED EMBODIMENTS

Figure 1:
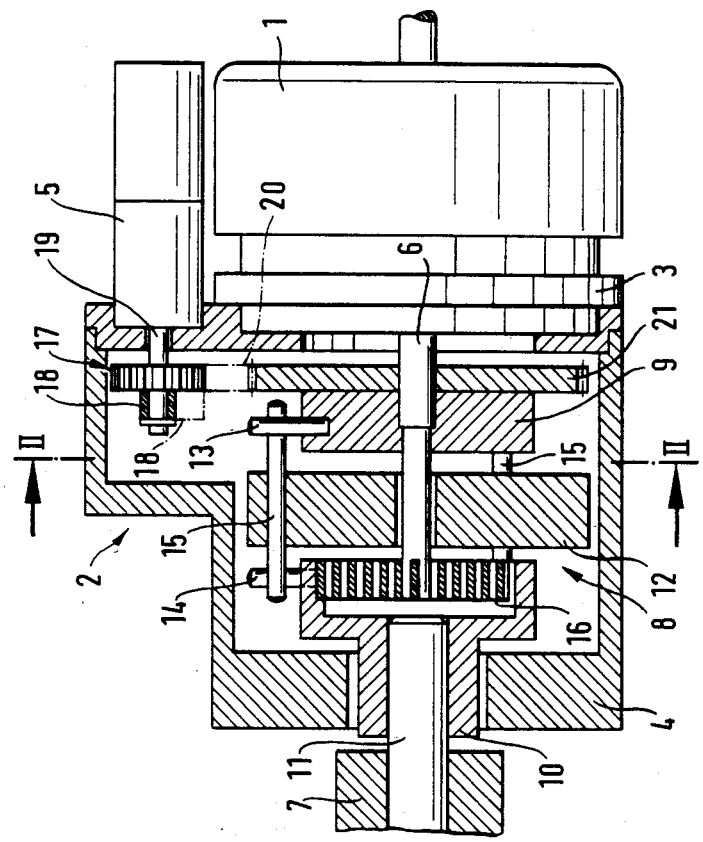
FIG. 1 is a representation of a first preferred embodiment of the present invention showing an angular motion transducer with the coupling shown in partial sectional representation.

Turning now to the drawings, FIG. 1 shows a standard angular motion transducer 1 attached to a coupling 2 which is sectionally represented. The transducer 1 comprises at least one graduation disk (not shown) with at least one reference mark. The graduation disk is of conventional construction and is located within the interior of the transducer 1. The graduation disk comprises an incremental graduation in addition to the reference mark and is scanned in a conventional manner by a scanning unit (not shown). The process of scanning and the operation of the transducer 1 are well documented in the literature and will therefore not be discussed in detail. Generally, the casing of the transducer 1 is attached to one of the machine components and the transducer shaft is fastened to the other of the machine components by means of a rotation rigid coupling. The shaft, during relative movement of the machine components, is turned with respect to the casing and with respect to the scanning unit located within the casing. The relative movement causes the scanning unit to scan the graduation disk and produce a measurement signal.

As shown in FIG. 1, the angular motion transducer 1 comprises a mounting flange 3 which is fastened to the coupling device 2. The casing 4 of the coupling device 2 is adapted to receive an electric motor 5 which is fastened to the casing 4 and positioned parallel to the axis of the angular motion transducer shaft 6. The graduation disk with the reference mark (not shown) is firmly mounted on the shaft 6. In addition, a carrier coupling 8 is mounted to the shaft 6 between the graduation disk and the machine component whose relative movement is to be measured. The carrier coupling 8 comprises a first connecting hub 9, a second connecting hub 10 and an annular disk 12. The first connecting hub 9 is fastened to the transducer shaft 6. The second connecting hub 10 is fastened to an additional shaft 11 which is allocated to the machine component 7. Three stops 13 and three stops 14 extend radially from the connecting hubs 9, 10, respectively. Each of the stops 13 is offset from one another by 120° and each of the stops 14 is offset from one another by 120°. The annular disk 12 is located between the connecting hubs 9, 10. Three bolts 15, offset 120° with respect to one another, protrude from both sides of the disk 12 in the axial direction from bores in the disk 12. The bolts 15 extend sufficiently in the axial direction to contact the stops 13, 14 upon rotation of the shafts 6, 11. The annular disk 12 is not rotatably supported on the shaft 6 by bearing means. The annular disk 12 is self-centering during rotation of the shafts 6, 11 due to the symmetrical arrangement of the bolts 15. This arrangement also results in the absence of undesirable transverse forces on the bearings (not shown) of the shafts 6, 11.

For a given direction of rotation of the object 7 and therewith the shaft 11, the carrier coupling 8 transfers rotational movement of the shaft 11 to the shaft 6 and the graduation disk (not shown). The transfer is performed by means of the contact of the bolts 15 with the stops 13, 14. However, if the direction of rotation of the shaft 11 is reversed, then the bolts 15 and the stops 14 would come out of contact and the shaft 6 would no longer by rotated. Therefore, to ensure that the bolts 15 remain in contact with the stops 13, 14 during a change in the direction of rotation, a spiral spring 16 is used to bias the shaft 6. One end of the spiral spring 16 is suspended from the free end of the shaft 6 and the other end of the spiral spring 16 is anchored in the connecting hub 10. The spiral spring 16 is biased such that the stops 13, 14 constantly contact the bolts 15. The biasing force of the spring 16 assures that the shaft 6 is rotated along with the shaft 11, independently of the rotational direction of the shaft 11. The moment of the spiral spring 16 is sufficient to cause the shaft 6 to rotate in response to the rotation of the machine component 7. The direction of this rotation is opposite to the direction transferred by means of the stops 13, 14 and bolts 15 through the carrier coupling 8. Thus, in both rotational directions of the object 7 to be measured, the shafts 6, 11 are joined with one another such that the relative position of the two objects can be exactly determined by the transducer 1.

To obtain a definite reference position for measuring the relative position of the two objects before the start of a new measurement, the object 7 is turned until a reference mark is scanned. In this reference position, a counter (not shown) may be set to the value "zero" or to another previously established numerical value or else to a numerical value determined by a program.

If a disturbance arises during a processing and measurement operation, as for example during a power failure, then the process and measurement are interrupted. In the absence of power, the measurement value present at the time of the failure as well as the reference position is lost. If the object 7 to be measured is in the form of a gripper of an industrial robot, then, upon power restoration, the object 7 may not generally be rotated until the scanning unit scans the original reference mark as was done before the start of the operation.

The present invention is able to reproduce the reference position without moving the object 7. This reproduction is performed by powering the drive motor 5 while allowing the shaft 11 to remain stationary.

Figure 2:
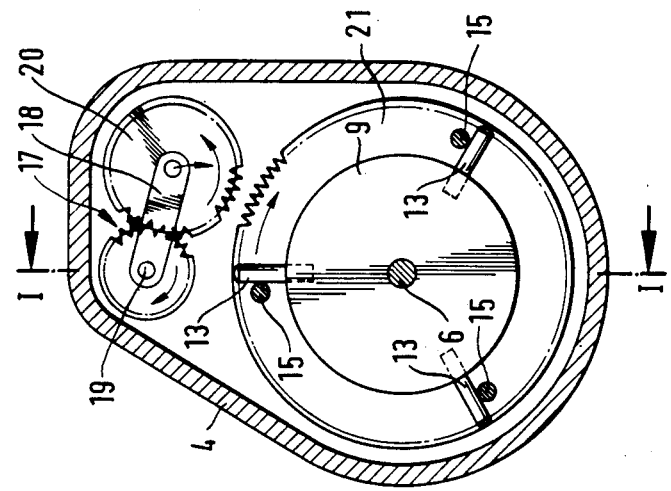
FIG. 2 is a sectional representation of the embodiment of FIG. 1 taken along the lines II—II.

As shown in FIG. 2, the drive motor 5 has a gear 17 connected to one end of a rocker arm 18. The other end of the rocker arm 18 is connected to an intermediate pinion 20 which is adapted for engagement with a gear wheel 21. The gear wheel 21 is fixedly mounted on the transducer shaft 6 between the graduation disk (not shown) and the connecting hub 9. When the motor 5 is switched on, the friction between the motor shaft 19 and the rocker arm 18 causes the rocker arm 18 to swing the intermediate pinion 20 into engagement with the gear wheel 21. Once the intermediate pinion 20 is coupled with the gear wheel 21, the transducer shaft 6 and the graduation disk (not shown) are rotated by the drive motor 5 against the moment of the spiral spring 16. The graduation disk is rotated until the reference mark is scanned by the scanning unit to produce a reference impulse which represents the reference position. The starting position is then reestablished from the reference impulse and the calibration completed. Further details of the process need not be discussed since they are sufficiently well known from the relevant literature.

After the reference mark is scanned, the drive motor 5 is switched off. The drive motor 5 and the transducer shaft 6 with the graduation disk (not shown) are then rotated in the opposite direction under the force of the biased spiral spring 16. The rotation continues until the stops 13, 14 contact the bolts 15. At this point, the graduation disk has been repositioned to the position it occupied before the calibration process. The engaged unpowered drive motor 5, which is also rotated, operates to dampen the rotational movements. Due to the inertia of the motor 5, the rocker arm 18, upon impact of the stops 13, 14 with the bolts 15, decouples the intermediate pinion 20 and therewith the drive motor 5 from the gear wheel 21.

Of course, the drive motor 5 could, after the reference impulse is generated, be pole-reversed to assist the spiral spring 16 in rotating the transducer shaft 6 back to the starting position. However, in either case, the graduation disk (not shown) may freely rotate with the carrier coupling 8 as soon as the intermediate pinion 20 has been disengaged from the gear wheel 21.

Once the graduation disk is disengaged from the influence of the gear 17 and the reference position obtained, the interrupted operating process may be continued.

Figure 3:
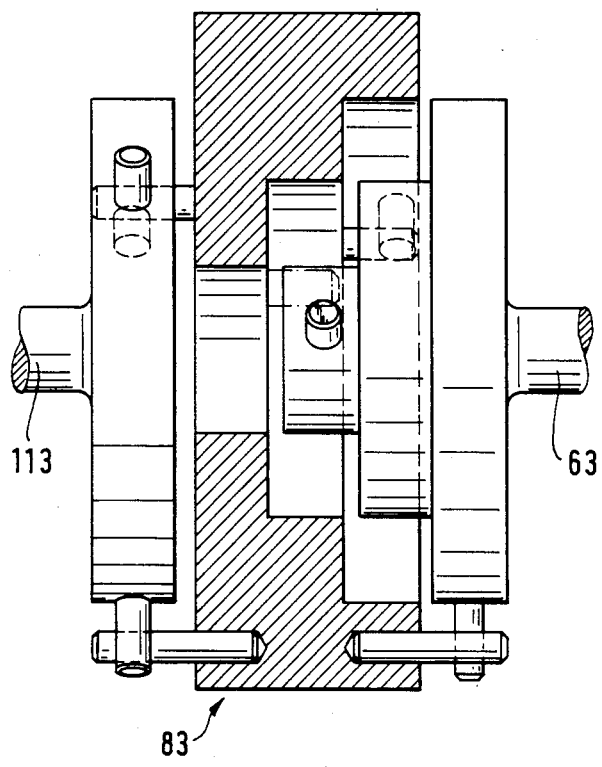
FIG. 3 is a representation of a second preferred embodiment of the present invention.

A second preferred embodiment is represented in FIG. 3. In this embodiment, the carrier coupling 83 is constructed in such a way that angles of rotation beyond 360° are possible.

The carrier coupling 8, shown in FIG. 1 presents in each case bolts 15 and stops 13, 14 offset to one another by 120°. Accordingly, relative rotation of the shaft 6 with respect to the shaft 11 during reproduction of the reference position is possible only within an angle of less than 240°. Therefore, unless the application of the transducer is such that the angle of relative rotation is confined to less than 240° the graduation disk (not shown) must comprise at least two reference marks to reproduce a lost reference position. The reference marks may be distinguished from one another by coding in the form of code marks such as described in German patent DE-PS 29 52 106.

To reproduce a lost reference position which only one reference mark on the graduation disk, the carrier coupling 83 may be used. Since only one reference mark is used in this embodiment, no further coding is necessary. The carrier coupling 83 permits a relative rotation of the shaft 63 with respect to the shaft 113 beyond an angle of 360°.

A thorough description of the carrier coupling 83 is given in German unexamined patent specification DE-OS 33 40 866. The description, with appropriate constructive adaptation, is applicable to the device of the present invention.

Of course, it should be understood that a wide range of changes and modifications can be made to the preferred embodiments described above. For example, this invention may be used with a variety of transducers including photoelectric, inductive and magnetic transducers. In addition, the rotational force supplied by the spiral spring 16 located within the carrier coupling 8, 83 could also be supplied by magnets or elastic snap connections. It is therefore intended that the foregoing detailed description be regarded as illustrative rather than limiting, and that it be understood that it is the following claims, including all equivalents, which are intended to define the scope of this invention.

I claim:

1. In a device for coupling a position measuring instrument with two objects movable relatively to one another, wherein the position measuring instrument comprises a measuring scale, at least one reference mark allocated to the measuring scale, and a scanning unit operative to scan the measuring scale and wherein a given relative position of the objects defines a start position of the measuring scale with respect to the scanning unit, the improvement comprising:

means for moving one of the measuring scale and scanning unit with respect to the other of the measuring scale and scanning unit in a first direction by direct mechanical force supplied through rigid mechanical communication with the objects;

means for biasing the one of the measuring scale and scanning unit in a second direction; and drive means operative to move the one of the measuring scale and scanning unit against the force of the biasing means such that the reference mark is scanned by the scanning unit, the drive means further operative to allow the one of the measuring scale and scanning unit to return to the start position after the reference mark is scanned by the scanning unit.

2. The invention of claim 1 wherein the drive means comprises an electric motor and wherein the improvement further comprises:

a gear rotatably driven by the electric motor;

a gear wheel in mechanical communication with the measuring scale such that rotation of the gear wheel produces rotation of the measuring scale; and an intermediate pinion operative to automatically engage the gear wheel and couple the electric motor with the gear wheel upon activation of the electric motor.

3. The invention of claim 1 wherein the drive means comprises a wheel and wherein the improvement further comprises:

a friction wheel in mechanical communication with the measuring scale such that rotation of the friction wheel produces rotation of the measuring scale;

the wheel and drive means operative to automatically couple the drive means with the friction wheel upon activation of the drive means.

4. The invention of claim 1 wherein the biasing means comprises a spiral spring.

5. In a device for coupling a position measuring instrument with two objects movable relatively to one another, wherein the position measuring instrument comprises a measuring scale, and a scanning unit operative to scan the measuring scale and wherein a given relative position of the objects defines a start position of the measuring scale with respect to the scanning unit, the improvement comprising:

means for mounting the measuring scale with respect to the scanning unit such that the measuring scale is moved relative to the scanning unit in a first direction in response to relative movement of the objects; and a spiral spring operative to bias one of the measuring scale and the scanning unit in a second direction; and drive means operable while the objects are stationary to move the one of the measuring scale and scanning unit against the biasing force of the spiral spring until the reference mark is scanned by the scanning unit, the drive means further operable to cooperate with the spiral spring to return the measuring scale and scanning unit to the start position after the reference mark is scanned by the scanning unit thereby enabling calibration of the measuring instrument while the objects are stationary with respect to one another.

6. The invention of claim 5 wherein the drive means comprises en electric motor and wherein the improvement further comprises:
   a gear rotatably driven by the electric motor;
   a gear wheel in mechanical communication with the measuring scale such that rotation of the gear wheel produces rotation of the measuring scale; and
   an intermediate pinion operative to automatically engage the gear wheel and couple the electric motor with the gear wheel upon activation of the electric motor.

7. The invention of claim 5 wherein the drive means comprises a wheel and wherein the improvement further comprises:
   a friction wheel in mechanical communication with the measuring scale such that rotation of the friction wheel produces rotation of the measuring scale;
   the wheel and drive means operative to automatically couple the drive means with the friction wheel upon activation of the drive means.

8. The invention of claim 5 wherein the drive means comprises an electric motor.

* * * * *